Sept. 12, 1933.                W. S. GRAHAM                1,926,531
                          MULTIPLE TOOL AND HOLDER
                             Filed Feb. 25, 1931
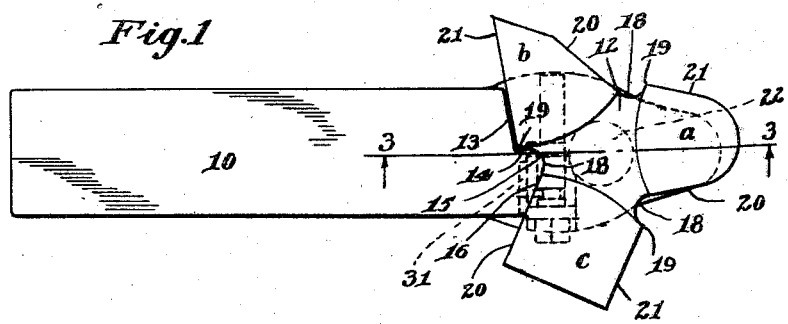
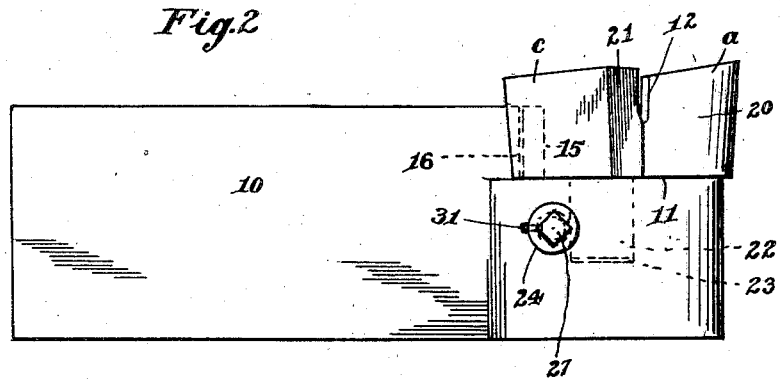
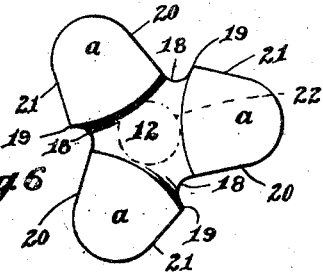
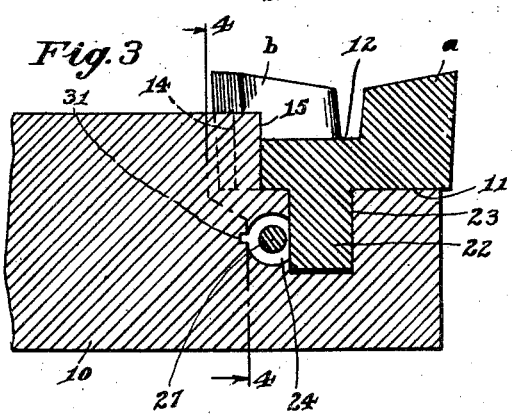
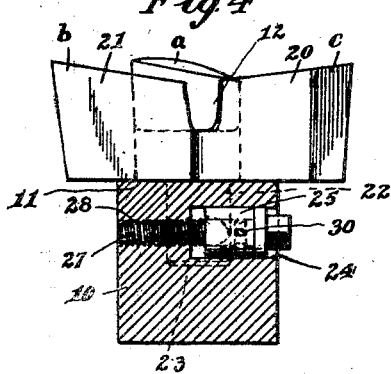
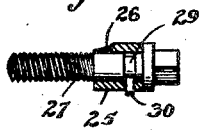
INVENTOR.
William S. Graham
BY
Chamberlain & Newman
ATTORNEYS.

Patented Sept. 12, 1933

1,926,531

UNITED STATES PATENT OFFICE 1,926,531

MULTIPLE TOOL AND HOLDER

William S. Graham, Tampa, Fla., assignor of one-half to Charles M. Hartt, East Dennis, Mass.

Application February 25, 1931
Serial No. 518,125

2 Claims. (Cl. 29—98)

This invention relates to new and useful improvements in multiple tools and holders, such as are used in lathes, planers and similar machine tools, and particularly relates to a tool of this type having a multiple point, detachable cutting tool in a manner to form several tools in one.

It is an object of the invention to provide an improved type of tool holder and detachable cutting tool having a series of cutting surfaces, which may be of different shapes and which, by the adjustment of the cutter in the holder, said different cutting points may be brought in position for performing desired operations upon the work. Further to provide simple and practical means of mounting the cutter, in a holder, whereby it can be easily adjusted and locked in such adjusted positions.

It is a further object of the invention to provide a multiple point tool of this character, which can be readily removed, sharpened and replaced or substituted by a somewhat similar tool having a greater or lesser number of finished cutting surfaces; further to provide means whereby this multiple point tool can be rotatably adjusted within the holder, thus enabling an operator to perform different kinds of cuts on a single piece of work by simply adjusting the cutter in the holder.

With these and other objects in view, the invention resides and consists in the construction and novel combination and arrangement of parts hereinafter more fully described, illustrated in the accompanying drawing, and pointed out in the claims hereto appended, it being understood that various changes in the form, proportions, size, and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which Fig. 1 shows a top plan view of my improved multiple tool and holder;

Fig. 2 is a side view of the multiple tool and holder shown in Fig. 1;

Fig. 3 is a central, vertical, longitudinal section through the tool and holder taken on line 3 of Fig. 1;

Fig. 4 is a vertical, cross-section taken on line 4—4 of Fig. 3;

Fig. 5 is a detailed, sectional elevation of the locking screw and clamping sleeve mounted thereon for securing the tool in the holder; and Fig. 6 shows a top plan view of a modified form of the multiple point tool.

My combined cutting tool and holder is formed of four parts including a locking screw and sleeve, and is adapted to provide a series of cutting points or surfaces, as shown in the drawing. Each of these surfaces may be of different shapes, if desired, as seen in Fig. 1 or substantially alike as shown in Fig. 6.

Referring in detail to the characters of reference marked upon the drawing, 10 represents the tool holder, which in part may be of the usual elongated shape for positioning in a tool post, not shown, and in this respect is preferably formed relatively thin and high. The upper side of the forward end portion of this holder is cut away to form a recess 11 to receive the cutting tool 12. The end walls 13 and 16 of this recess are angularly disposed with respect to each other, and are provided with an oval, intersecting, vertical wall portion 15, better to conform to and receive the adjacent abutting side surfaces of the cutting tool. In this respect, it will be noted that the vertical concaved recesses 18 in the sides of the cutter are shaped to snugly receive the rounded wall 15 of the holder, whereas the shoulders 19 of the cutter similarly engage with the shoulders 14, of the holder. The before mentioned diverging angular surface 20 of the side of the cutting tool engages the inclined side wall 16 of the holder, where as the inclined surface 13 of the holder and the grindable surfaces 21 of the cutting tool are retained in spaced relation to each other. The surface 16 together with the shoulder 14 formed in the end of the wall of the holder serve as an engaging or interlocking means for the shoulders 20 and 19 of the cutter, in a way to prevent it from turning. The cutting tool further includes a central, depending, pivotal shank portion 22 that is rotatably mounted in a round vertical hole 23. The holder is further provided with a transverse intersecting hole 24, in which a sleeve 25 is slidably mounted. This sleeve is provided with a beveled side portion 26 for engagement with the side of the shank 22 of the cutting tool for the purpose of clamping the same to lock the tool in position. This sleeve 25 is mounted upon an adjusting screw 27, whose inner threaded end portion engages a threaded hole 28, in the holder, in alignment with the before mentioned hole 24 though of a smaller diameter. The screw 27 is provided with an annular groove 29 for the engagement of the pin 30 mounted in the sleeve, so that the sleeve will be held on the screw against longitudinal movement, while the screw is free to be rotated therein. In order to prevent the sleeve from turning and to insure the engagement of its beveled face with the shank 22, I have provided an elongated key-way 31 in the wall of the hole 24 to receive the projected end of the pin mounted in the sleeve in a manner to prevent the sleeve from turning, yet allowing it and its pin free longitudinal movement.

By this means, it will be seen that by the use of a suitable wrench that is adapted to engage the head of the screw 27 and if necessary enter the hole 24, the screw may be operated in a way to move the locking sleeve longitudinally within the hole 24 and to and from the shank of the cutter in a manner to engage or disengage said shank as may be necessary to remove the tool.

The several cutting surfaces a, b and c may be sharpened from time to time, one suitable grinding wheel, and when replaced in the holder, the operator would move the tool around until edge 20, see Fig. 1, is brought into close contact with the inclined walls 16 of tool holder, whereupon the screw 27 is tightened. As a consequence, there is no strain on the screw clamp by the cutting operations to follow, as the thrust all comes on points 16 and 20, as will be obvious. Inasmuch as the cutting surfaces, a, b, and c extend forward of the end of the holder, there is presented considerable stock on the top and outer surfaces of the cutter members to be ground away in the sharpening operations and whereby a large proportion of the metal of the cutter may be used.

Having thus described my invention, what I claim and desire to secure by Letters Patent, is

1. In a combined multiple tool and holder of the class described, a holder having a recess formed in the top side of its forward end portion and a vertical hole central of the recessed end of the holder, there being a shoulder whose face is central and longitudinally of the holder adjacent the recess and inclined flat surfaces on each side of the shoulder, one of said flat surfaces being forward of the other, a cutting tool having a shank positioned in the recess, clamping means for securing the shank in said recess, the said cutting tool including a series of radial extensions having cutting surfaces and shouldered recesses therebetween, each of said extensions having flat diverging side walls cut at different angles with respect to each other to correspond to that of the two inclined flat surfaces of the holder on opposite sides of the central shoulder.

2. A combined multiple tool and holder of the class described, comprising a holder having a recess formed in the top side of its end portion and a vertical hole formed in and central of the recess end of the holder, there being a shoulder disposed central and longitudinally of the holder and forming a side wall of the recess, and an inclined flat surface on one side of the shoulder, the inner end of said surface being forward of the outer and terminating with the forward edge of the shoulder, a cutting tool having an integral shank positioned in the recess, clamping means for securing the shank in said recess, the said cutting tool including a series of radial extensions each having cutting surfaces and a concave shouldered recess between the extensions, each of said extensions having a flat diverging side wall cut at an angle to correspond to that of the inclined flat surface of the holder.

WILLIAM S. GRAHAM.